Figure 1:
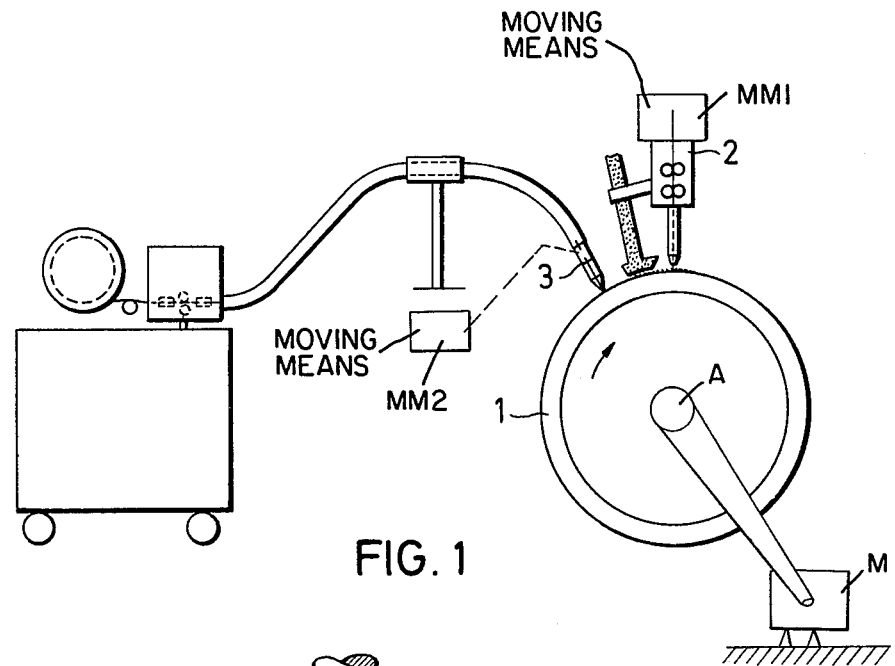

United States Patent [19]

Zwintscher et al.

[11] 4,237,361
[45] Dec. 2, 1980

[54] BUILDUP WELDING OF INCLINED SURFACES

[75] Inventors: Wolfgang Zwintscher, Soest; Horst Kittel, Hamm-Pelkum; Hinrich Ruge, Hamm, all of Fed. Rep. of Germany

[73] Assignee: August Thyssen Aktiengesellschaft, Duisburg-Hamborn, Fed. Rep. of Germany

[21] Appl. No.: 891,344

[22] Filed: Mar. 29, 1978

Related U.S. Application Data

[63] Continuation of Ser. No. 679,331, Apr. 22, 1976.

[30] Foreign Application Priority Data

Apr. 30, 1975 [DE] Fed. Rep. of Germany ....... 2519274

[51] Int. Cl.³ ............................. B23K 9/04; B23K 9/18
[52] U.S. Cl. ................................. 219/76.1; 219/73.11
[58] Field of Search ................. 219/76.1, 76.11, 76.12, 219/76.14, 130.1, 60 A, 60 R, 76.16, 125.11, 137.2, 73.11

[56] References Cited

U.S. PATENT DOCUMENTS

| 1,924,876 | 8/1933 | Morgan | 427/37 |
| 2,527,336 | 10/1950 | Schaefer | 219/60 R X |
| 2,906,861 | 9/1959 | Lesnewich | 219/130.1 |
| 2,965,746 | 12/1960 | Cresswell | 219/137.2 |
| 3,142,747 | 7/1964 | Walker | 219/61 X |
| 3,219,397 | 11/1965 | Heldenbrand et al. | 219/76 X |
| 3,752,946 | 8/1973 | Bailey et al. | 219/76 X |
| 4,143,260 | 3/1979 | Backstrom et al. | 219/121 P |

FOREIGN PATENT DOCUMENTS 840185 4/1939 France ................................ 219/137 R Primary Examiner—B. A. Reynolds
Assistant Examiner—Keith E. George
Attorney, Agent, or Firm—Toren, McGeady and Stanger

[57] ABSTRACT

A method of building up lines or layers of metal on a region of a workpiece, especially a region which terminates at the top of a vertical surface of the workpiece, by fusion arc welding, comprises: building up a barrier along at least one edge of the region, and this is along the top of the vertical surface when one exists, by welding with a low-power arc and then building up the remainder of the region against the barrier by welding with a much higher power arc, which is preferably of the submerged-arc type.

5 Claims, 2 Drawing Figures

BUILDUP WELDING OF INCLINED SURFACES

This is a continuation of Application Ser. No. 679,331, filed Apr. 22, 1976.

The invention refers to a method and apparatus for building up lines or layers of metal by fusion arc welding and particularly by submerged-arc welding.

In building-up regions on workpieces by welding, the satisfactory forming of surfaces extending to the top of vertical surfaces of the workpieces causes great difficulty. Without supporting walls electric arc welding at the top of a vertical wall is only possible with a low power arc such as that occurring in the case of manual rod-electrode welding with thin electrodes. With higher power arcs, the weld metal pool must be supported by supporting walls or barriers against the effect of gravity and be moulded to the required surface structure. When the higher power arc is of the submerged arc type, the flux powder covering the weld metal pool must also be supported against the effects of gravity. For these purposes, various methods are known which in most cases make use of mechanical accessories. Thus, in the case of arc welding known as electro-slag welding, a water-cooled copper shoe is used to contain the weld pool and the shoe is either carried upwards in synchronism with the rising weld pool or remains stationary and is removed after the weld pool has solidified.

It is also known to use a heat-resistant mineral material, for example, asbestos in the form of cord or sheet to support the weld pool and the powder covering in the case of a submerged arc. In either case, it is a matter of using a mould which must be removed after the weld has solidified. Moulds integral with a workpiece have been used occasionally if they remained in place as a remnant or edge of the workpiece, for example, after roll building up by welding. For the production of thick-walled or massive workpieces or the production of coatings of pure weld metal on workpieces such as for example, heavy one-piece shafts, only the use of moulds as described above have been used or proposed.

According to this invention, a method of building up lines or layers of metal on a region of a workpiece by fusion arc welding comprises building up a barrier along at least one edge of the region by welding with a low-power arc and then building up the part of the region against the barrier by welding with a higher power arc.

Preferably the barrier is built up using an arc having a consumable electrode and it is further preferred that the part of the region against the barrier is built-up by submerged arc welding.

Since a low-power arc is used for the erection of the barrier, dripping down of the molten weld metal does not occur as the surface tension of the molten weld metal is sufficient to support the metal against the force of gravity. Consequently, weld metal can be built-up into a narrow barrier at any point on a flat or inclined surface and may be placed along an edge of a generally flat workpiece. The barrier built-up by welding may be quite small when compared to the moulds used before and, when the moulds are integral with the workpiece, are machined less heavily than the surface of the workpiece.

Compared with building up by welding using cooled shoes or moulds which have to be subsequently removed, building up by welding in accordance with this invention has the advantages of eliminating the moulds and reducing the work of subsequent machining of the workpiece. Since building up by welding is a technique which is particularly used with "one off jobs" forming large components, conventional building up by welding as distinct from building up by welding in accordance with this invention, requires first of all the manufacture of at least one special shoe or mould for each job. Further, cooled shoes and moulds are sometimes disadvantageous to the formation of the structure of the parts of the weld coming into contact with them because of their cooling action on the molten weld metal. Because of the higher rate of cooling in the region of the shoe or mould, different stresses and structures of the metal occur in this region than in the remainder of the workpiece.

The invention also encompasses, according to another of its aspects, apparatus for carrying out the method in accordance with the invention, the apparatus including at least one low-power arc welding machine having a welding head for building up the barrier or barriers, at least one higher power arc welding machine having a welding head for building up the part of the region against the barrier, and means for moving both the welding heads relatively to the workpiece to move over the region in such a way that the weld metal deposited by the head of the low-power machine is always higher above the surface of the workpiece than the weld metal deposited against it by the head of the higher power machine.

Figure 2:
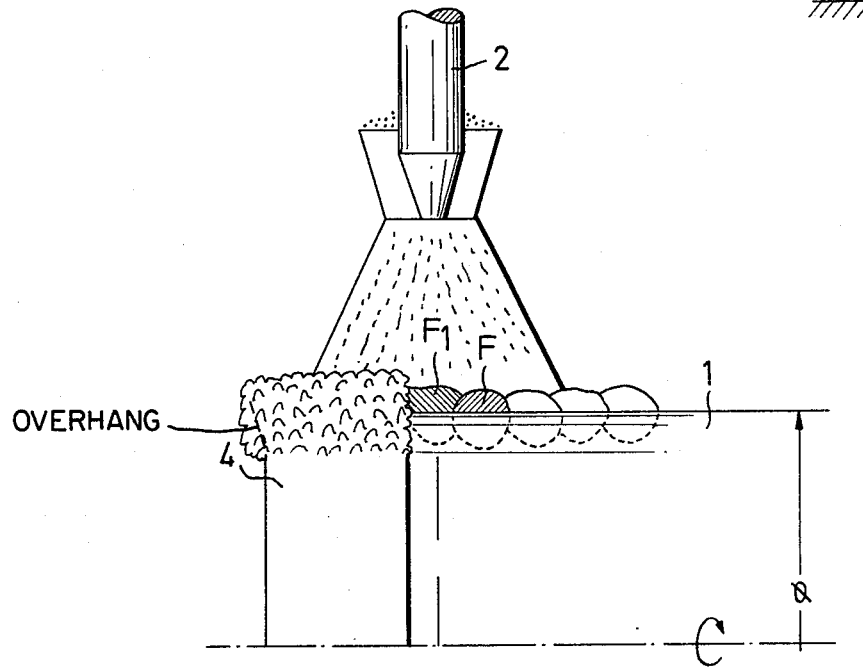

An example of a method and of apparatus in accordance with this invention will now be described with reference to the accompanying drawings, in which:

FIG. 1 is a diagrammatic illustration of the welding apparatus in operation; and, FIG. 2 is a side elevation to a larger scale showing part of a workpiece being built up by welding and part of the welding apparatus.

In the illustrated example, a workpiece in the form of a shaft for a turbine runner is to be re-conditioned by building up by welding using the apparatus shown in FIG. 1. For this purpose, above the peripheral surface of the shaft 1 which is supported on a shaft A and rotated by known means M, a main welding head 2 is mounted so that it is movable horizontally and vertically by known means MM1. This head has a power of 15 to 35 KW. A number of main welding heads 2 can alternatively be arranged to operate one after another in order to raise the welding power. At each end of the shaft 1 there is an auxiliary welding head 3 which is also movable horizontally and vertically by known means MM2. Whilst the main welding head is of the submerged-arc type, the auxiliary welding heads 3 effect shielded-arc welding with consumable wire electrodes (MIG- or MAG-welding). The auxiliary welding heads 3 operate with short arcs and have such a low fusion power that dripping down of the molten weld metal does not occur. In this way at the ends of the shaft 1 layers or lines of welding can be superimposed on each other to form barriers 4.

Although the fusion power of each auxiliary welding head 3 is considerably lower than that of the main welding head 2 which at each pass along the shaft 1 lays a layer of weld bead, the barriers 4, which act as a mould for the weld layers always reach the required greater height before the main welding head 2 has completed its horizontal axial to and fro movement, since the quantity of weld metal which has to be deposited by each auxiliary welding head is must less than the quantity of weld metal deposited by the main welding head.

In order to prevent the shielding powder discharged from the submerged arc welding head 2 from falling over the vertical surfaces at the ends of the shaft 1, the widths of the barriers 4 must be equal to about half the diameter of the cone of repose of the powder plus a safety clearance of 10 to 20 mm.

In order to ensure that the shaft is built up to a uniform diameter in the region close to the barrier 4 without having to adjust the fusion power of the main welding head as it approaches the barrier, the cross-sectional area F of the penultimate weld bead deposited by the head 2 as the shaft 1 rotates, must be equal to the cross-sectional area $F_1$ to be filled between the penultimate weld bead and the inside of the barrier.

If $F_1$ were greater than F, the diameter of the shaft at this point would become smaller, since the last bead of weld metal deposited would not then be adequate to fill completely the gap between the penultimate weld bead and the edge of the barrier. If $F_1$ were smaller than F the diameter of the shaft would become bigger at this point, since the quantity of weld metal would be too great for filling the gap between the penultimate weld bead and the edge of the barrier. The width of the barrier must therefore be made such that $F_1$ is equal to F.

The auxiliary welding heads are preferably constructed to operate with a power of from 2.5 to 7 KW. Since a single auxiliary welding head may not be adequate to erect on its own a barrier 4 of the necessary height and width because its welding power is too small, a number of auxiliary welding heads 3 may be arranged to operate one after another in a circumferential direction round the shaft 1 in such a way that the weld metal from the first head is adequately cooled before it reaches the next welding arc.

The weld metal for the barrier 4 may have mechanical characteristics which are the same as, similar to, or different from the weld metal which is employed for the remainder of the shaft. Thus, for example, a heavily profiled body with many recesses such as a disc runner of a turbine, should consist of a weld metal with similar characteristics to those of the barrier. In this way there is a considerable saving in the subsequent machining operation which is necessary, especially since the roughness of the end faces of the shaft which occur when using the method in accordance with the invention is very much less than with other techniques and merely requires smooth finishing by machining.

Advantageously the viscosity of the molten weld metal from which the barrier is formed is so high that it is possible to form the barriers with overhanging end profiles. The deviation from the vertical may amount to 30° or even more.

We claim:

1. For a workpiece having an inclined or vertical region defined by at least one edge, a method of building up the region of the workpiece by deposition on it of weld metal by fusion arc welding comprising: the steps of building up an elongated barrier along the one edge of said region by depositing weld material with a first arc welding device producing an arc of sufficiently low power that the molten weld material can form a barrier on the region without mechanical run-off preventing aids while leaving the end of the region otherwise free of extensions, and then building up a part of the region against said barrier by depositing weld metal with a second welding device having a higher power arc.

2. A method as claimed in claim 1, wherein said step of building up said barrier is carried out by using an arc having a submerged consumable welding electrode.

3. A method as claimed in claim 1, wherein said step of building up said part of said region against said barrier is carried out using submerged-arc welding.

4. A method as claimed in claim 1, wherein said step of building up said barrier and said step of building up said part of said region against said barrier are carried out at the same time, but with said building up of said barrier proceeding ahead of said building up of said region against said barrier.

5. A method as claimed in claim 1, wherein said barrier has a face directed away from said part of said region, at least part of said face having an overhanging profile.

* * * * *